United States Patent
Fieldsend et al.

[11] 3,935,723
[45] Feb. 3, 1976

[54] WIRE PROCESSING MACHINE

[75] Inventors: Alan Fieldsend; Ronald Jubb, both of Sheffield, England

[73] Assignee: British Steel Corporation, London, England

[22] Filed: Dec. 27, 1973

[21] Appl. No.: 428,669

[30] Foreign Application Priority Data
Dec. 29, 1972 United Kingdom............. 59983/72

[52] U.S. Cl. .................. 72/275; 72/278; 72/340; 72/41
[51] Int. Cl.² ............... B21C 1/04; B21C 1/16
[58] Field of Search ............ 72/275, 285, 274, 278, 72/280, 282, 291, 289, 338, 340, 341, 464, 40, 41; 29/33 F, 33 D; 82/20

[56] References Cited
UNITED STATES PATENTS

| | | | |
|---|---|---|---|
| 738,932 | 9/1903 | O'Donnell | 72/285 X |
| 2,928,528 | 3/1960 | Kelday et al. | 72/285 X |
| 3,038,361 | 6/1962 | Holzer | 82/20 X |
| 3,157,093 | 11/1964 | Shaw et al. | 72/275 X |
| 3,430,477 | 3/1969 | Breyer | 72/275 |
| 3,557,588 | 1/1971 | Catlin et al. | 72/275 X |
| 3,695,083 | 10/1972 | Garfield | 72/285 |
| 3,760,488 | 9/1973 | Cucuz | 29/424 X |

FOREIGN PATENTS OR APPLICATIONS

| | | | |
|---|---|---|---|
| 1,177,901 | 9/1964 | Germany | 72/275 |
| 1,173,307 | 7/1964 | Germany | 72/275 |
| 1,226,395 | 10/1966 | Germany | 82/20 |
| 1,921,569 | 11/1969 | Germany | 72/275 |
| 624,737 | 6/1949 | United Kingdom | 82/20 |

*Primary Examiner*—C. W. Lanham
*Assistant Examiner*—D. M. Gurley
*Attorney, Agent, or Firm*—Bacon & Thomas

[57] ABSTRACT

This invention relates to a wire processing machine comprising a die through which wire is drawn along a rectilinear path and a turning head downstream of the die at which the die-drawn wire is surface turned. The turning head is rotatably mounted in bearings which are oil-mist lubricated.

3 Claims, 2 Drawing Figures

WIRE PROCESSING MACHINE

This invention relates to a wire processing machine.

From one aspect the present invention provides a wire processing machine comprising a die through which wire is drawn along a rectilinear path and a turning head downstream of the die at which the die-drawn wire is surface turned.

Preferably, the die is stationary and the turning head includes a plurality of cutters revolving about the axis of the wire-drawing path.

A soap box may be provided upstream, or as part, of the drawing die in order to facilitate drawing.

A pinch roll assembly may be provided downstream of, and adjacent to, the turning head for steadying and guiding the wire, a wire coiler being provided for drawing the wire through the machine and temporarily housing the finished product. A soap box with a guide bush may be provided upstream of the coiler to lubricate the wire and assist its 'lay' in this unit, and the guide bush might conveniently provide a polishing function.

The turning head may rotate at speeds of something of the order of 5000 revs per minute or more, oil-mist lubrication being adopted for the bearings at this high speed.

A machine in accordance with this invention thus provides in one compact unit facilities for both drawing and turning wire, the amount of material which is necessary to remove by the surface turning step to impart the necessary dimension and finish to the wire thus being minimal.

Major savings in metal costs may thus be effected as compared with wire turned direct from the rolled or rough drawn product which of course is frequently non-circular in section when presented for turning. Further, a machine of this nature is capable of processing wire at a much faster rate than hitherto, e.g. up to about 150 ft. per minute for, say, ⅜ inch diameter finish-turned alloy steel wire, the turning step removing a nominal 1/100 inch or so.

In order that the invention may be fully understood, one embodiment thereof will now be described, by way of example, with reference to the accompanying drawings in which.

Figure 1:
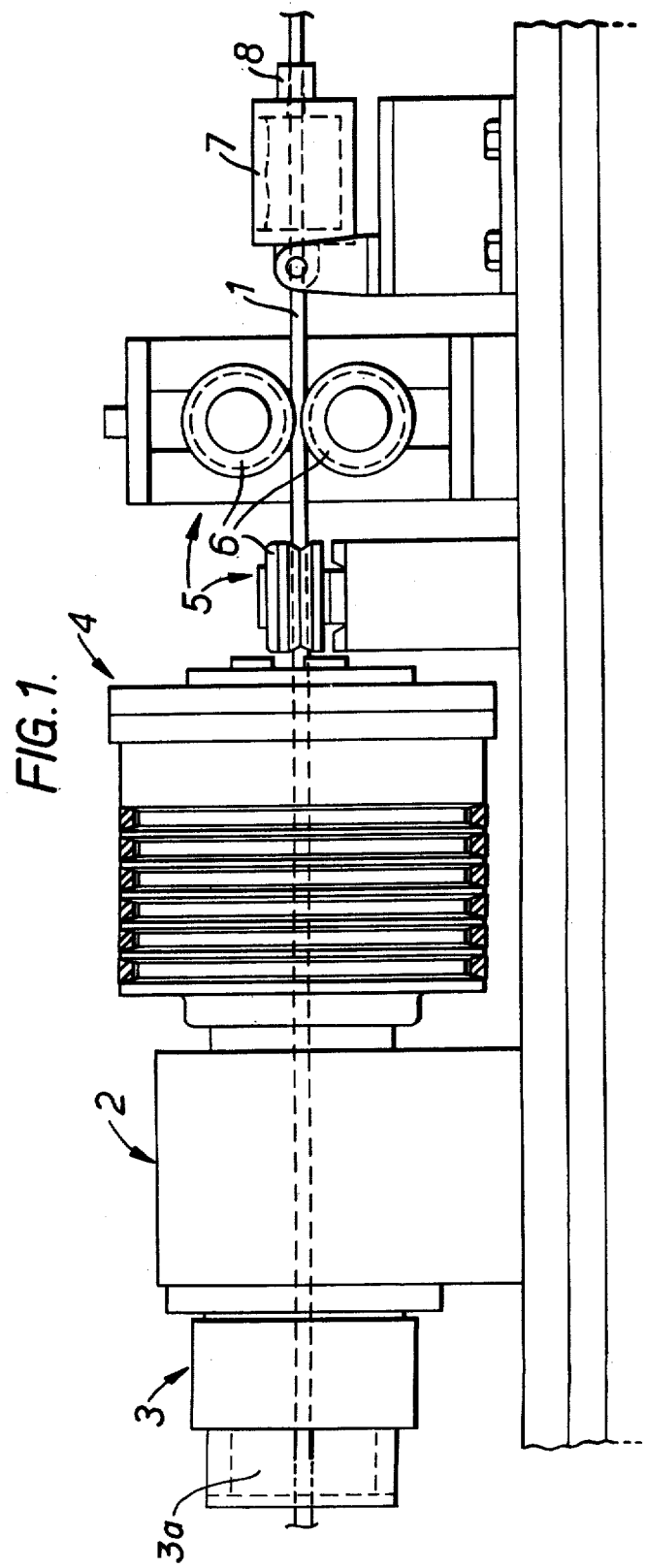
FIG. 1 illustrates a side elevation of the machine.

Referring now to FIG. 1, the machine is shown with an alloy steel wire 1 in situ and comprises a mounting 2 carrying a drawing-die head 3 and associated wire lubricating soap box 3a and a belt-driven turning head 4 downstream of the die. A pinch roll assembly 5 comprising dual stands, each carrying a pair of free-running rolls 6, provide a steadying influence on the turned wire and a soap box 7 with a guide bush 8 is provided for lubricating the wire prior to coiling on a coiler (not shown) which imparts the tractive force.

Figure 2:
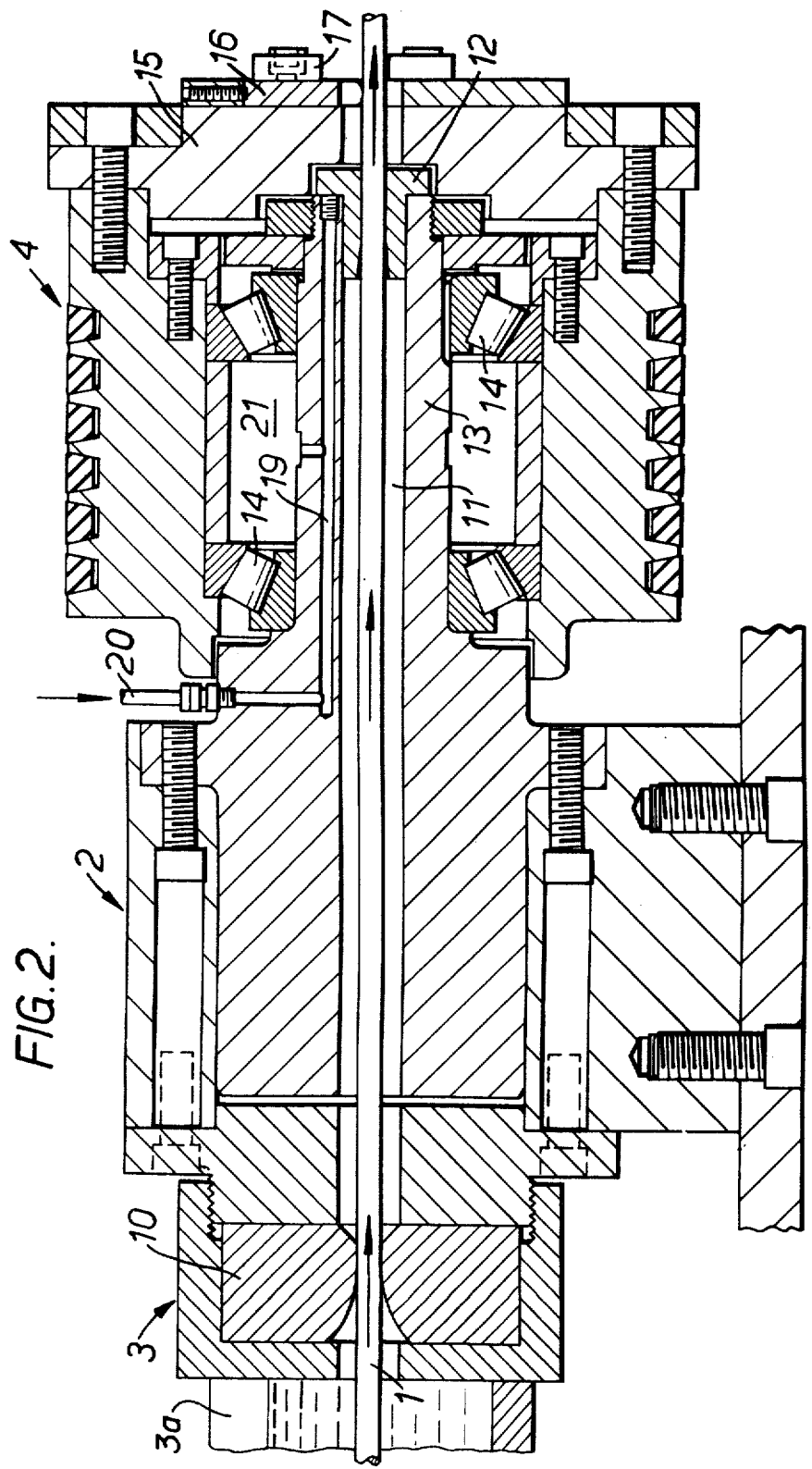
FIG. 2 illustrates a sectional elevation through part of the machine illustrated in FIG. 1.

Referring now more particularly to FIG. 2, the drawing head 3 includes a captive die block 10, the aperture in which is aligned with a bore 11 extending through the mounting 2 and which terminates adjacent the turning head in a guide bush 12 on a protruding boss 13. The turning head 4 is mounted for rotation about the boss 13 on roller bearings 14, and carries a face plate 15 on which are symmetrically mounted three cutting tools 16 held in clamps 17 (only two of which are visible).

A bored passage 19 is provided in the boss to which atomised oil (oil/air mist) is supplied under pressure through a conduit 20, the passage communicating with an annular cavity 21 defined between the roller bearings 14. The turning head/boss design is such as to permit the oil mist to escape through the roller bearings to atmosphere, no seals being provided.

In operation rolled wire is first provided with a reduced end section which is threaded through the machine and clamped on to a block on the coiler. The turning head is then rotated at high speed, the oil mist is applied and the coiler is rotated to impart the tractive force on the wire.

In a typical operation rolled alloy steel wire, say, 13/32 inch diameter (0.406 inch) is drawn to 0.385 in the die block 10 and then turned to ⅜ inch diameter (0.375) by tools 16, the rotational speed of the turning head being 5000 rpm with the rate of wire throughput at 150 ft. per minute. Since a constant cutting rate is aimed at, these speeds (rotational and translational) will be increased or decreased accordingly with smaller or larger diameter wire.

Although this invention has been described with reference to the particular embodiment illustrated it is to be understood that various changes and modifications may be made without departing from the scope of this invention. Further, although oil mist lubrication is utilised in preference to liquid oil, since it is this which enables the rates mentioned to be maintained without significant detriment to the life of the bearings, liquid oil lubrication could alternatively be used at lower rates with seals being provided. A facility may also be provided whereby part of the head 4 on which the tools are mounted is detachable so that the whole tool assembly may be replaced as one unit. This avoids the need for individually handling tools which may be very hot from use.

Finally, although in the embodiment described reference is made to alloy steel wire, stainless, carbon or even non-ferrous wire rods and tubes etc. may equally well be processed.

We claim:

1. A machine for continuously processing wire drawn therethrough by a wire coiler, comprising:

a fixed mounting having a protruding boss at one end and defining a through bore and housing as one unit, a stationary wire drawing die fixed in said housing at one end of the bore and, fixed in said housing at the other end of the bore, a wire guide bush, the bore of said die and the bore of said bush being in axial alignment and in alignment with the axis of said bore, a wire turning head rotatably mounted on said housing adjacent said wire guide bush in roller bearings carried by said protruding boss, said roller bearings being spaced apart defining a cavity therebetween, means on said wire turning head for turning it, a bored passage in said mounting and in said boss communicating with said cavity for conducting an atomized oil mist to said bearings, and a lubricating soap box fixedly mounted on said housing upstream of the die for lubricating wire drawn therethrough, a further wire guide bush and a further lubricating soap box being mounted downstream of the turning head and in axial alignment with the bore of said die and said turning head, the wire being processed by being drawn through the die and then through the turning head whereby the wire is initially die drawn and then surface turned.

2. A machine according to claim 1, comprising a plurality of circumferentially spaced turning tools on said turning head, part of said head containing the tools being detachable for replacement.

3. A wire processing machine according to claim 1, comprising a pinch roll assembly mounted downstream of the turning head for steadying and guiding the wire.

* * * * *